US009282099B2

(12) United States Patent  
Adams et al.

(10) Patent No.: US 9,282,099 B2
(45) Date of Patent: *Mar. 8, 2016

(54) SYSTEM AND METHOD FOR PRIVILEGE MANAGEMENT AND REVOCATION

(71) Applicant: BlackBerry Limited, Waterloo (CA)

(72) Inventors: Neil Patrick Adams, Waterloo (CA); Herbert Anthony Little, Waterloo (CA)

(73) Assignee: BlackBerry Limited, Waterloo, Ontario (CA)

(*) Notice: Subject to any disclaimer, the term of this patent is extended or adjusted under 35 U.S.C. 154(b) by 0 days.

This patent is subject to a terminal disclaimer.

(21) Appl. No.: 13/960,214

(22) Filed: Aug. 6, 2013

(65) Prior Publication Data

US 2013/0340049 A1 Dec. 19, 2013

Related U.S. Application Data

(63) Continuation of application No. 12/561,370, filed on Sep. 17, 2009, now Pat. No. 8,522,321, which is a continuation of application No. 11/169,302, filed on Jun. 29, 2005, now Pat. No. 7,614,082.

(51) Int. Cl.
*G06F 21/51* (2013.01)
*H04L 29/06* (2006.01)
*G06F 12/14* (2006.01)

(52) U.S. Cl.
CPC .............. *H04L 63/10* (2013.01); *H04L 63/105* (2013.01); *H04L 63/1408* (2013.01); *H04L 63/20* (2013.01)

(58) Field of Classification Search
CPC ............................ H04L 63/20; H04L 67/125
See application file for complete search history.

(56) References Cited

U.S. PATENT DOCUMENTS

| | | | |
|---|---|---|---|
| 4,815,128 A | 3/1989 | Malek | |
| 4,837,812 A | 6/1989 | Takahashi et al. | |

(Continued)

FOREIGN PATENT DOCUMENTS

| | | |
|---|---|---|
| CA | 2505343 | 6/2010 |
| CA | 2547708 C | 7/2010 |

(Continued)

OTHER PUBLICATIONS

Document relating to CA Application No. 2547708, dated Apr. 14, 2009 (Office Action).

(Continued)

*Primary Examiner* — Venkat Perungavoor
(74) *Attorney, Agent, or Firm* — Integral Intellectual Property Inc.; Miriam Paton; Amy Scouten

(57) ABSTRACT

The present disclosure relates generally to the management of privileges associated with certain applications that are accessible by users of electronic equipment, such as, for example, networked computers, mobile wireless communications devices, and the like. In a broad aspect, a method for managing privileges associated with applications comprises: monitoring a plurality of electronic devices within a system; detecting a change in privileges associated with one or more applications resident on the plurality of electronic devices, wherein one or more privileges that are to be revoked are identified; and in response to a detection of the change in privileges, revoking the one or more privileges, such that each of the one or more applications resident on the plurality of electronic devices no longer has access to the one or more privileges.

20 Claims, 5 Drawing Sheets

(56) References Cited

U.S. PATENT DOCUMENTS

| | | | |
|---|---|---|---|
| 4,945,556 A | 7/1990 | Namekawa | |
| 4,972,457 A | 11/1990 | O'Sullivan | |
| 4,991,197 A | 2/1991 | Morris | |
| 5,220,604 A | 6/1993 | Gasser et al. | |
| 5,327,560 A * | 7/1994 | Hirata et al. | 709/221 |
| 5,398,233 A | 3/1995 | Balmer et al. | |
| 5,408,520 A | 4/1995 | Clark et al. | |
| 5,606,594 A | 2/1997 | Register et al. | |
| 5,675,782 A * | 10/1997 | Montague et al. | 726/4 |
| 5,774,551 A | 6/1998 | Wu et al. | |
| 5,802,483 A | 9/1998 | Morris | |
| 5,826,265 A | 10/1998 | Van Huben et al. | |
| 5,850,515 A | 12/1998 | Lo et al. | |
| 5,864,765 A | 1/1999 | Barvesten | |
| 5,881,225 A | 3/1999 | Worth | |
| 5,924,094 A | 7/1999 | Sutter | |
| 5,987,440 A | 11/1999 | O'Neil et al. | |
| 5,987,611 A | 11/1999 | Freund | |
| 6,052,735 A | 4/2000 | Ulrich et al. | |
| 6,105,132 A | 8/2000 | Fritch et al. | |
| 6,125,447 A | 9/2000 | Gong | |
| 6,131,136 A | 10/2000 | Liebenow et al. | |
| 6,219,694 B1 | 4/2001 | Lazaridis et al. | |
| 6,233,446 B1 | 5/2001 | Do | |
| 6,243,756 B1 | 6/2001 | Whitmire et al. | |
| 6,253,326 B1 | 6/2001 | Lincke et al. | |
| 6,285,889 B1 | 9/2001 | Nykanen et al. | |
| 6,292,798 B1 | 9/2001 | Dockter et al. | |
| 6,321,334 B1 | 11/2001 | Jerger et al. | |
| 6,343,313 B1 | 1/2002 | Salesky et al. | |
| 6,351,816 B1 | 2/2002 | Mueller | |
| 6,360,322 B1 | 3/2002 | Grawrock | |
| 6,405,202 B1 | 6/2002 | Britton et al. | |
| 6,412,070 B1 | 6/2002 | Van Dyke et al. | |
| 6,490,289 B1 | 12/2002 | Zhang et al. | |
| 6,516,421 B1 | 2/2003 | Peters | |
| 6,647,388 B2 | 11/2003 | Numao et al. | |
| 6,668,323 B1 | 12/2003 | Challener et al. | |
| 6,745,047 B1 | 6/2004 | Karstens et al. | |
| 6,748,543 B1 | 6/2004 | Vilhuber | |
| 6,757,821 B1 | 6/2004 | Akiyama et al. | |
| 6,772,350 B1 | 8/2004 | Belani et al. | |
| 6,775,536 B1 | 8/2004 | Geiger et al. | |
| 6,785,810 B1 | 8/2004 | Lirov et al. | |
| 6,795,688 B1 | 9/2004 | Plasson et al. | |
| 6,795,967 B1 | 9/2004 | Evans et al. | |
| 6,886,038 B1 | 4/2005 | Tabbara et al. | |
| 6,895,502 B1 | 5/2005 | Fraser | |
| 6,901,429 B2 | 5/2005 | Dowling | |
| 6,957,330 B1 | 10/2005 | Hughes | |
| 6,976,241 B2 | 12/2005 | Cruz et al. | |
| 6,978,385 B1 | 12/2005 | Cheston et al. | |
| 6,999,562 B2 | 2/2006 | Winick | |
| 7,042,988 B2 | 5/2006 | Juitt et al. | |
| 7,076,239 B2 | 7/2006 | Kirkup et al. | |
| 7,076,797 B2 | 7/2006 | Loveland | |
| 7,146,638 B2 | 12/2006 | Malcolm | |
| 7,187,678 B2 | 3/2007 | Cunetto | |
| 7,246,374 B1 | 7/2007 | Simon et al. | |
| 7,315,750 B2 | 1/2008 | Chou et al. | |
| 7,330,712 B2 | 2/2008 | Kirkup et al. | |
| 7,331,058 B1 | 2/2008 | Gladney | |
| 7,400,878 B2 | 7/2008 | Hassan et al. | |
| 7,546,956 B2 | 6/2009 | Adams et al. | |
| 7,574,200 B2 | 8/2009 | Hassan et al. | |
| 7,603,466 B2 | 10/2009 | Kilian-Kehr et al. | |
| 7,614,082 B2 | 11/2009 | Adams et al. | |
| 7,721,087 B1 | 5/2010 | DiPasquo et al. | |
| 7,734,284 B2 | 6/2010 | Adams et al. | |
| 7,751,331 B1 | 7/2010 | Blair et al. | |
| 7,765,185 B2 | 7/2010 | Rangadass | |
| 7,793,355 B2 | 9/2010 | Little et al. | |
| 7,869,789 B2 | 1/2011 | Hassan et al. | |
| 7,886,053 B1 | 2/2011 | Newstadt et al. | |
| 7,917,963 B2 | 3/2011 | Goyal et al. | |
| 7,921,452 B2 | 4/2011 | Ridlon et al. | |
| 8,005,469 B2 | 8/2011 | Adams et al. | |
| 8,074,078 B2 | 12/2011 | Brown et al. | |
| 8,208,900 B2 | 6/2012 | Adler et al. | |
| 8,495,700 B2 | 7/2013 | Shahbazi | |
| 8,495,731 B1 | 7/2013 | Mar et al. | |
| 8,503,340 B1 | 8/2013 | Xu | |
| 8,522,321 B2 | 8/2013 | Adams et al. | |
| 8,620,297 B2 | 12/2013 | Kirkup et al. | |
| 8,626,139 B2 | 1/2014 | Kirkup et al. | |
| 2001/0047485 A1 | 11/2001 | Brown et al. | |
| 2001/0056549 A1 | 12/2001 | Pinault et al. | |
| 2002/0001288 A1 * | 1/2002 | Fukunaga et al. | 370/252 |
| 2002/0013815 A1 | 1/2002 | Obradovich et al. | |
| 2002/0019944 A1 | 2/2002 | Kou | |
| 2002/0031230 A1 | 3/2002 | Yu et al. | |
| 2002/0087880 A1 | 7/2002 | Rhoades | |
| 2002/0095414 A1 | 7/2002 | Barnett et al. | |
| 2002/0095497 A1 | 7/2002 | Satagopan et al. | |
| 2002/0107943 A1 * | 8/2002 | Heath et al. | 709/220 |
| 2002/0112155 A1 | 8/2002 | Martherus et al. | |
| 2002/0184398 A1 | 12/2002 | Orenshteyn | |
| 2003/0005317 A1 | 1/2003 | Audebert et al. | |
| 2003/0014521 A1 | 1/2003 | Elson et al. | |
| 2003/0026220 A1 | 2/2003 | Uhlik et al. | |
| 2003/0031184 A1 | 2/2003 | Cunetto et al. | |
| 2003/0035397 A1 | 2/2003 | Haller et al. | |
| 2003/0037237 A1 | 2/2003 | Abgrall et al. | |
| 2003/0054860 A1 | 3/2003 | Chen | |
| 2003/0061087 A1 | 3/2003 | Srimuang | |
| 2003/0065676 A1 | 4/2003 | Gbadegesin et al. | |
| 2003/0070091 A1 | 4/2003 | Loveland | |
| 2003/0087629 A1 | 5/2003 | Juitt et al. | |
| 2003/0093698 A1 | 5/2003 | Challener et al. | |
| 2003/0120948 A1 | 6/2003 | Schmidt et al. | |
| 2003/0126437 A1 | 7/2003 | Wheeler et al. | |
| 2003/0163685 A1 | 8/2003 | Paatero | |
| 2003/0167405 A1 | 9/2003 | Freund et al. | |
| 2003/0177389 A1 | 9/2003 | Albert et al. | |
| 2003/0226015 A1 | 12/2003 | Neufeld et al. | |
| 2003/0233410 A1 | 12/2003 | Gusler | |
| 2003/0236983 A1 | 12/2003 | Mihm, Jr. | |
| 2004/0001101 A1 | 1/2004 | Trajkovic et al. | |
| 2004/0083382 A1 | 4/2004 | Markham et al. | |
| 2004/0097217 A1 | 5/2004 | McClain | |
| 2004/0098610 A1 | 5/2004 | Hrastar | |
| 2004/0100983 A1 | 5/2004 | Suzuki | |
| 2004/0121802 A1 | 6/2004 | Kim et al. | |
| 2004/0132449 A1 | 7/2004 | Kowarsch | |
| 2004/0139206 A1 | 7/2004 | Claudatos et al. | |
| 2004/0177073 A1 | 9/2004 | Snyder et al. | |
| 2004/0187029 A1 | 9/2004 | Ting | |
| 2004/0193738 A1 | 9/2004 | Natu et al. | |
| 2004/0209608 A1 | 10/2004 | Kouznetsov et al. | |
| 2004/0260710 A1 | 12/2004 | Marston | |
| 2005/0154935 A1 | 7/2005 | Jin | |
| 2005/0164687 A1 | 7/2005 | DiFazio | |
| 2005/0182832 A1 | 8/2005 | Chen | |
| 2005/0192008 A1 | 9/2005 | Desai et al. | |
| 2005/0193080 A1 * | 9/2005 | Gold et al. | 709/208 |
| 2005/0210270 A1 | 9/2005 | Rohatgi et al. | |
| 2005/0213763 A1 | 9/2005 | Owen et al. | |
| 2005/0245272 A1 | 11/2005 | Spaur et al. | |
| 2005/0288903 A1 | 12/2005 | Jackson et al. | |
| 2006/0059556 A1 | 3/2006 | Royer | |
| 2006/0070114 A1 | 3/2006 | Wood et al. | |
| 2006/0090136 A1 | 4/2006 | Miller et al. | |
| 2006/0120526 A1 | 6/2006 | Boucher et al. | |
| 2006/0129848 A1 | 6/2006 | Paksoy et al. | |
| 2006/0129948 A1 | 6/2006 | Hamzy et al. | |
| 2006/0149846 A1 | 7/2006 | Schuba | |
| 2006/0156026 A1 | 7/2006 | Utin | |
| 2006/0168259 A1 | 7/2006 | Spilotro et al. | |
| 2006/0168395 A1 | 7/2006 | Deng et al. | |
| 2006/0206931 A1 | 9/2006 | Dillaway et al. | |
| 2006/0212589 A1 | 9/2006 | Hayer et al. | |
| 2006/0274750 A1 | 12/2006 | Babbar et al. | |
| 2007/0019643 A1 | 1/2007 | Shaheen | |
| 2007/0050854 A1 | 3/2007 | Cooperstein et al. | |

(56) References Cited

U.S. PATENT DOCUMENTS

| | | |
|---|---|---|
| 2007/0073694 A1 | 3/2007 | Picault et al. |
| 2007/0156766 A1 | 7/2007 | Hoang et al. |
| 2007/0204153 A1 | 8/2007 | Tome et al. |
| 2007/0204166 A1 | 8/2007 | Tome et al. |
| 2007/0254631 A1 | 11/2007 | Spooner |
| 2007/0277127 A1 | 11/2007 | Carlson et al. |
| 2008/0002726 A1 | 1/2008 | Haung et al. |
| 2008/0081609 A1 | 4/2008 | Burgan et al. |
| 2008/0098237 A1 | 4/2008 | Dung et al. |
| 2008/0125146 A1 | 5/2008 | Bainbridge |
| 2008/0130524 A1 | 6/2008 | Volach et al. |
| 2008/0132202 A1 | 6/2008 | Kirkup et al. |
| 2008/0134347 A1 | 6/2008 | Goyal et al. |
| 2008/0137593 A1 | 6/2008 | Laudermilch et al. |
| 2008/0222711 A1 | 9/2008 | Michaelis |
| 2008/0235041 A1 | 9/2008 | Cashdollar et al. |
| 2008/0318616 A1 | 12/2008 | Chipalkatti et al. |
| 2009/0031393 A1 | 1/2009 | Denner |
| 2009/0070181 A1 | 3/2009 | Loeffen |
| 2009/0094668 A1 | 4/2009 | Corbin et al. |
| 2009/0178107 A1 | 7/2009 | Karjoth et al. |
| 2009/0181662 A1 | 7/2009 | Fleischman et al. |
| 2009/0254753 A1 | 10/2009 | De Atley et al. |
| 2009/0260052 A1 | 10/2009 | Bathula et al. |
| 2010/0024016 A1 | 1/2010 | Violleau et al. |
| 2010/0024020 A1 | 1/2010 | Baugher et al. |
| 2010/0081417 A1 | 4/2010 | Hickie |
| 2010/0088753 A1 | 4/2010 | Ayres et al. |
| 2010/0107215 A1 | 4/2010 | Bechtel et al. |
| 2010/0153969 A1 | 6/2010 | Dyba et al. |
| 2010/0175104 A1 | 7/2010 | Khalid |
| 2010/0184440 A1 | 7/2010 | Mao et al. |
| 2010/0222097 A1 | 9/2010 | Gisby et al. |
| 2010/0242086 A1 | 9/2010 | Adams et al. |
| 2010/0278162 A1 | 11/2010 | Groux et al. |
| 2010/0281487 A1 | 11/2010 | Schneider et al. |
| 2010/0299376 A1 | 11/2010 | Batchu et al. |
| 2010/0299394 A1 | 11/2010 | Jania et al. |
| 2010/0319053 A1 | 12/2010 | Gharabally |
| 2010/0325221 A1 | 12/2010 | Cohen et al. |
| 2010/0325430 A1 | 12/2010 | Denninghoff |
| 2010/0325710 A1 | 12/2010 | Etchegoyen |
| 2011/0010699 A1 | 1/2011 | Cooper et al. |
| 2011/0082808 A1 | 4/2011 | Beykpour et al. |
| 2011/0099605 A1 | 4/2011 | Cha et al. |
| 2011/0126214 A1 | 5/2011 | O'Farrell et al. |
| 2011/0145833 A1 | 6/2011 | De Los Reyes et al. |
| 2011/0179083 A1 | 7/2011 | Galloway et al. |
| 2011/0195698 A1 | 8/2011 | Pearce |
| 2011/0210171 A1 | 9/2011 | Brown et al. |
| 2011/0252240 A1 | 10/2011 | Freedman et al. |
| 2011/0270963 A1 | 11/2011 | Saito et al. |
| 2011/0314467 A1 | 12/2011 | Pearson |
| 2012/0005477 A1 | 1/2012 | Wei et al. |
| 2012/0005723 A1 | 1/2012 | Chaturvedi et al. |
| 2012/0023573 A1 | 1/2012 | Shi |
| 2012/0054853 A1 | 3/2012 | Gupta et al. |
| 2012/0079110 A1 | 3/2012 | Brown et al. |
| 2012/0079586 A1 | 3/2012 | Brown et al. |
| 2012/0079609 A1 | 3/2012 | Bender et al. |
| 2012/0109826 A1 | 5/2012 | Kobres |
| 2012/0144196 A1 | 6/2012 | Owen et al. |
| 2012/0202527 A1 | 8/2012 | Obradovich et al. |
| 2012/0210443 A1 | 8/2012 | Blaisdell et al. |
| 2012/0214442 A1 | 8/2012 | Crawford et al. |
| 2012/0214503 A1 | 8/2012 | Liu et al. |
| 2012/0278863 A1 | 11/2012 | Wallace et al. |
| 2012/0278904 A1 | 11/2012 | Perez et al. |
| 2012/0291140 A1 | 11/2012 | Robert et al. |
| 2012/0309344 A1 | 12/2012 | Ferrazzini et al. |
| 2012/0324067 A1 | 12/2012 | Hari et al. |
| 2013/0074142 A1 | 3/2013 | Brennan et al. |
| 2013/0097657 A1 | 4/2013 | Cardamore et al. |
| 2013/0174222 A1 | 7/2013 | Ogle |
| 2013/0219465 A1 | 8/2013 | Tse et al. |
| 2013/0346606 A1 | 12/2013 | Ryerson et al. |

FOREIGN PATENT DOCUMENTS

| | | |
|---|---|---|
| CN | 1897543 A1 | 1/2007 |
| CN | 100466547 C | 3/2009 |
| CN | 101523878 | 9/2009 |
| EP | 605106 | 7/1994 |
| EP | 973350 | 1/2000 |
| EP | 1043648 A2 | 10/2000 |
| EP | 1168141 | 1/2002 |
| EP | 1471691 | 10/2004 |
| EP | 1596410 | 11/2005 |
| EP | 1624428 | 2/2006 |
| EP | 1739518 A1 | 1/2007 |
| EP | 1806674 | 7/2007 |
| EP | 1739518 B1 | 10/2007 |
| EP | 1868135 A1 | 12/2007 |
| EP | 1563663 | 10/2008 |
| EP | 2337300 | 6/2011 |
| GB | 2378780 | 2/2003 |
| GB | 2408179 | 5/2005 |
| GB | 2440015 | 1/2008 |
| JP | 2000253241 | 9/2000 |
| JP | 2001077811 | 3/2001 |
| JP | 2001203761 | 7/2001 |
| JP | 2002288087 | 10/2002 |
| SG | 128561 A1 | 1/2007 |
| WO | 96/25828 | 8/1996 |
| WO | 99/05814 | 2/1999 |
| WO | 00/60434 | 10/2000 |
| WO | 0059225 | 10/2000 |
| WO | 2004017592 | 2/2004 |
| WO | 2004/043031 | 5/2004 |
| WO | 2004043031 | 5/2004 |
| WO | 2005045550 | 5/2005 |
| WO | 2006130807 | 12/2006 |
| WO | 2007048251 | 5/2007 |
| WO | 2009012329 | 1/2009 |
| WO | 2009014975 | 1/2009 |
| WO | 2009021200 | 2/2009 |
| WO | 2012037656 | 3/2012 |
| WO | 2012037657 | 3/2012 |
| WO | 2012037658 | 3/2012 |
| WO | 2012109497 | 8/2012 |

OTHER PUBLICATIONS

Document relating to CA Application No. 2547708, dated Jan. 4, 2010 (Notice of Allowance).
Document relating to SG Application No. 200603557.0, dated Nov. 28, 2008 (Notification of Grant).
Document relating to CN Application No. 200610092754.X, dated Mar. 28, 2008 (Office Action).
Document relating to CN Application No. 200610092754.X, dated Mar. 28, 2008 (English Translation of Chinese Office Action).
Document relating to CN Application No. 200610092754.X, dated Dec. 19, 2008 (Notification of Completion of Formalities for Registration and Notification of Grant of Rights for Invention Patent).
Document relating to IN Application No. 1174/DEL/2006, dated Oct. 13, 2008 (Indian Examination Report).
Document relating to IN Application No. 1174/DEL/2006, dated Oct. 8, 2009 (Indian Examination Report).
Prosecution documents relating to U.S. Appl. No. 11/169,302, now issued as U.S. Pat. No. 7,614,082.
Prosecution documents relating to U.S. Appl. No. 12/631,370, now issued as U.S. Pat. No. 8,522,321.
Prosecution documents relating to EP Application No. 05254068.9, now issued as EP1739518.
Prosecution documents relation to EP Application No. 07117749.7, now refused.
Chakravorty, "Architecture and Implementation of a remote management framework for dynamically reconfigurable device", ICON, 2002.

(56) References Cited

OTHER PUBLICATIONS

Hedbom et al., "Analysis of the Security of Windows NT", XP002364916, Chalmers University of Technology, Goteborg, Sweden, p. 1-97, Mar. 1, 1999.
"Using Software Restriction Policies in Windows XP and Windows, NET server to Protect Against Unauthorized Software", XP0029559638, Microsoft XP and Windows Net Technical Article, p. 1-52, Jan. 2002.
Bellavista et al., "Dynamic Binding in Mobile Applications a Middleware Approach", IEEE Internet Computing, Mar.-Apr. 2003.
Red Hat: "Red Hat Linux 7.2—The Official Red Hat Linux Reference Guide" Red Hat Linux Manuals, 'Online!' Oct. 22, 2001, XP002276029, pp. 145-155.
Sygate: "Sygate Personal Firewall PRO User Guide" Sygate Personal Firewall Pro User Guide, XX, XX, 2001, pp. 1-77 XP002248366.
"A Technical Overview of the Lucent VPN Firewall" White Paper Lucent Technologies, XX, XX, Aug. 2002. pp. 1-35, XP002271173, Chapter 1.
View messages with restricted permission sent by using IRM; Support/Outlook/Outlook2007 Help and How-to. http://office.microsoft.com/en-us/outlook-help/view-messages-with-restricted-permission-sent-by-using-irm-HA01246115.as . . . , pp. 1-2, retrieved on Feb. 12, 2010.
Send an e-mail messaged with restricted permission by using IRM; Support/Outlook/Outlook 2007 Help and How-to. http"//office.microsoft.com/en-us/outlook-help/send-an-e-mail-message-with-restricted-permission-by-using-irm-HA01024780 . . . , pp. 1-4, retrieved on Feb. 12, 2010.
Introduction to using IRM for e-mail messages;Support/Outlook/Outlook 2007 Help and How-to. http"//office.microsoft.com/en-us/outlook-help/introduction-to-using-irm-for-a-email-message-HA0100366.aspx?CTT=5 . . . , pp. 1-6, retrieved on Feb. 12, 2012.
Smartphone Security Beyond Lock and Wipe (Jun. 10, 2010): http://www.enterprisemobiletoday.com/article.php/3887006.
Basic Access Authentication (Jan. 23, 2010): http://en.wikipedia.org/wiki/Basic_access_authentication.
Digital Access Authentication (Dec. 23, 2009): http://en.wikipedia.org/wiki/Digital_access_authentication.
Cross-site request forgery (Nov. 30, 2008): http://eg.wikipedia.org/wiki/cross-site_request_forgery.
"Customizing User Interaction in Smart Phones", Pervasive Computing, IEEE CS (2006) pp. 81-90 (URL: http://www.idi.ntnu.no/grupperlsu/bibliography/pdf/2006/Korpipaa2006pc.pdf).
"Supporting Mobile Privacy and Security through Sensor-Based Context Detection". Julian Seifert, Second International Workshop on Security and Privacy in Spontaneous Interaction and Mobile Phone Use, May 17, 2010, Finland (URL: http://www.medien.ifi.lmu.de/iwssi2010/papers/iwssi-spmu201 O-seifert.pdf).
EagleVision: A Pervasive Mobile Device Protection System, Ka Yang, Nalin Subramanian, Daji Qiao, and Wen sheng Zhang, Iowa State University (URL: http://www.cs.iastate.edu/-wzhang/papers/eagleVision.pdf).
"Using context-profiling to aid access control decisions in mobile devices", Gupta et al., Nokia Research Center (URL: http://www/cerias.purdue.edu/assets/symposium/2011-posters1372-C48.pdf) Please refer to the I-page file named 372-C48.pdf.
"Owen, Russel N., U.S. Appl. No. 10/524,353, filed Feb 14, 2005; Title: System and Method for Secure Control of Resources of Wireless Mobile Communication Devices Secure Control of Resources of Wireless Mobile Communication Device".
Bender, Christopher Lyle; U.S. Appl. No. 13/074,136, filed Mar. 29, 2011; Title: Data Source Based Application Sandboxing.
Owen, Russell N., U.S. Appl. No. 10/524,353, filed Aug. 19, 2003; Title: System and Method for Secure Control of Resources of Wireless Mobile Communication Devices.
XP002167366; CHen, Zhigun; "Java Card Technology for Smart Cards: Architecture and Programmer's Guide"; "Applet Firewall and Object Sharing;" Internet citation: Jun. 2, 2000; <http://developer.java.sun.com/developer/books/consumerproducts/javacard/ch09.pdf>.
Google Inc.; Android 2.3.4 User's Guide; May 20, 2011; 384 pages.
Microsoft Corp.; Microsoft Outlook 2010; Released Jul. 15, 2010; 27 pages.
Microsoft Office: Microsoft Outlook 2010 Product Guide; Microsoft Corp. 2010; published in 2010; 65 pages.
Windows 7 Product Guide; Microsoft Corp. 2009; published in 2009; 140 pages.
Research in Motion, "Blackberry Bridge App 2.1 and Blackberry PlayBook Tablet 2.1, Security Technical Overview"; Version: 6.1; Sep. 17, 2012; 90 pages.
Research in Motion, "Blackberry Device Service 6.1 and Blackberry PlayBook Tablet 2.1, Security Technical Overview"; Version: 6.1; Sep. 17, 2012; 90 pages.
Ferguson et al., U.S. Appl. No. 13/293,743, "Managing Cross Perimeter Access," filed Nov. 10, 2011.
Singh, Anish, Examiner, Australian Patent Office, Australian Application No. 2009202857, filed Apr. 29, 2005, in Examiner's First Report, mailed Nov. 5, 2010, 3 pages.
IETF RFC 3530; "Network File System (NFS) Version 4 Protocol"; Apr. 2003.
"Secure Inter-Process Communication"; Apr. 4, 2004. Retrieved from internet Jan. 20, 2014 https://web.archive.org/web/20040404015137/http://cr.yp.to/docs/secureipc.html.
Prosecution Documents for U.S. Appl. No. 11/118,791, issued to U.S. Pat. No. 7,734,284 on Jun. 8, 2010.
Prosecution Documents for U.S. Appl. No. 12/795,252, issued to U.S. Pat. No. 8,005,469 on Aug. 23, 2011.
Prosecution Documents for U.S. Appl. No. 13/490,956, issued to U.S. Pat. No. RE44,746 on Feb. 4, 2014.
Prosecution Documents for U.S. Appl. No. 10/698,602 issued to U.S. Pat. No. 7,076,239 on Jul. 11, 2006.
Prosecution Documents for U.S. Appl. No. 11/483,445 issued to U.S. Pat. No. 7,330,712 on Feb. 12, 2008.
Prosecution Documents for U.S. Appl. No. 12/016,632 issued to U.S. Pat. No. 8,626,139 on Jan. 7, 2014.
Prosecution Documents for U.S. Appl. No. 13/540,349 issued to U.S. Pat. No. 8,620,297 on Dec. 31, 2013.
Preliminary Amendment. U.S. Appl. No. 14/163,416. Dated: Aug. 23, 2011.
Office Action. U.S. Appl. No. 14/093,610. Dated: Mar. 7, 2014.
Amendment. U.S. Appl. No. 14/093,610. Dated: Jun. 6, 2014.
Final Office Action. U.S. Appl. No. 14/093,610. Dated: Aug. 8, 2014.
Terminal Disclaimer. U.S. Appl. No. 14/093,610. Dated: Oct. 8, 2014.
Response After Final Office Action. U.S. Appl. No. 14/093,610. Dated: Oct. 8, 2014.
Terminal Disclaimer Review. U.S. Appl. No. 14/093,610. Dated: Oct. 10, 2014.

* cited by examiner

SYSTEM AND METHOD FOR PRIVILEGE MANAGEMENT AND REVOCATION

CROSS REFERENCE TO RELATED APPLICATION

This application is a continuation of U.S. patent application Ser. No. 12/561,370, filed on Sep. 17, 2009, and issued to patent as U.S. Pat. No. 8,522,321, which is a continuation of U.S. patent application Ser. No. 11/169,302, filed on Jun. 29, 2005, and issued to patent as U.S. Pat. No. 7,614,082. The entire contents of U.S. patent application Ser. No. 12/561,370, and U.S. patent application Ser. No. 11/169,302 are hereby incorporated by reference.

FIELD OF THE INVENTION

The present invention relates generally to the management of privileges associated with certain applications that are accessible by users of electronic equipment, such as, for example, networked computers, mobile wireless communications devices, and the like. In particular, the disclosure is directed to systems and methods for managing privileges associated with particular applications and for revoking these privileges in a timely and robust manner.

RELATED ART

It is well known that certain electronic equipment, such as, for example, networked computers, mobile wireless communications devices, and the like, include applications resident on such equipment that may have access to certain privileges that enable the applications to perform various functions. Typically, a system administrator may use IT policy and application control to set the privileges associated with various applications present on the equipment that is subject to the administrator's control. Examples of privileges may include, for example, allowing an application to use inter-process communication (IPC), enabling the opening of internal and external connections, enabling the injection of browser filters, enabling Bluetooth™ functionality, enabling use of e-mail, enabling the use of personal information management (PIM) functionality, use of application program interface (API), etc. It is important for the system administrator be able to track which applications have access to which privileges, and to be able to revoke privileges on an as needed basis.

For example, if an application has access to a privilege, and the system administrator revokes that privilege, the application should immediately, or within a small window of time, be denied access to that privilege. In other words, the privilege should be revoked as soon as possible. Events that might trigger a revocation of privileges may include, for example, an application being loaded before the IT administrator/application control data is present on the device, an application is discovered to be a rogue application, or company policy changes, resulting in limiting the use or availability of certain applications and/or privileges associated therewith.

Regardless of the reason for privilege revocation, such revocation must be accomplished in a secure manner and in a manner that prevents possible work arounds by malicious applications or individuals. In general, according to current privilege revocation schemes, privilege checking is typically performed on the first access to a privilege. For example, applications communicate with IPC using the application registry. Once an application has a reference (e.g., pointer) to the application registry, it is difficult to take this reference away from the application. In another example, if an application has passed some if its privileges to another application using IPC, conventional systems can detect that the first application has access to IPC, but there is no way to detect that the other application has been passed the privilege(s).

Therefore, there remains a need for a system and method for effectively managing privileges associated with applications, and in particular, when privilege revocation is required, to revoke these privileges in a timely and robust manner.

BRIEF DESCRIPTION OF THE DRAWINGS

These and other embodiments along with their attendant advantages are described herein with reference to the following drawings in which like reference numerals refer to like elements, and wherein.

DETAILED DESCRIPTION OF EXEMPLARY EMBODIMENTS

Figure 1:
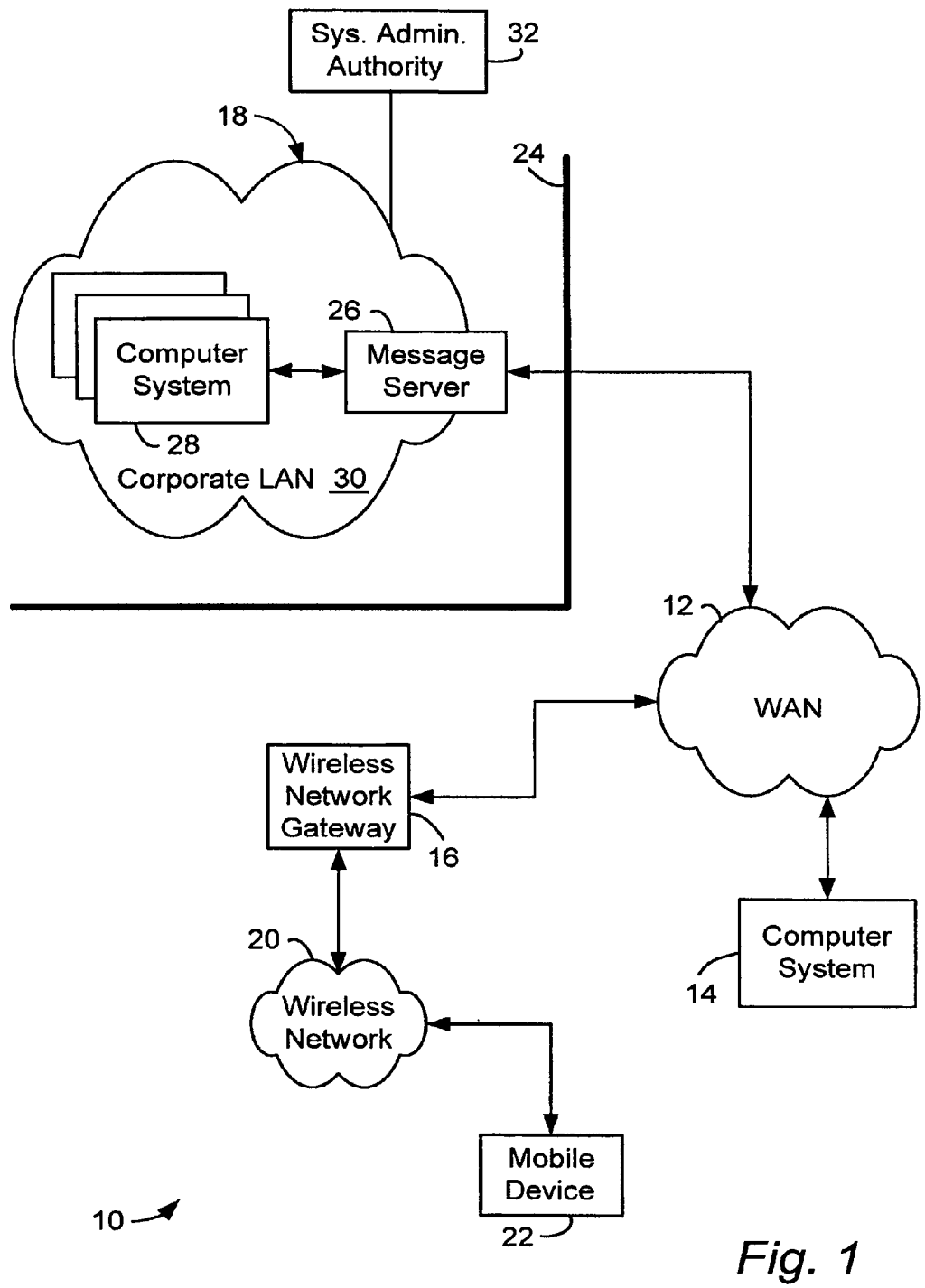
FIG. 1 is a block diagram showing a computer network and communication system in which electronic devices running applications having access to associated privileges are used.

In view of the foregoing, we have now identified an efficient, accurate, robust and easy to implement system and method for managing privileges associated with particular applications and for revoking these privileges in a timely and reliable manner According to an exemplary embodiment an application having privileges that are to be revoked may be shut down. When this application is restarted, access to revoked privileges will be denied. In order to keep track of which applications need to be shut down and reset, the system must keep track of which applications have accessed which privileges. To enable monitoring of the privileges accessed by applications, each time an application uses a privilege, the system records the application identifier and which privilege has been accessed. This may be done in any of a number of conventional methods, such as, for example, a data table listing the application identifier and corresponding accessed privilege(s) associated with the application identifier. When the system administrator, or any other authority, institutes a change in privileges, the system accesses the record of which applications have accessed which privileges. A comparison of accessed privileges with the privileges to be revoked is performed. Each application that has accessed a privilege that is to be revoked is identified by the system and then shut down. When the application is restarted, the application will not have access to any of the revoked privileges.

In another embodiment, a device reset may be performed. By resetting a device, the system is brought to a known state. According to this embodiment, a system administrator, or any other authority, specifies that a device must be reset when a new policy that revokes (or changes) privileges is instituted. A device reset may be instituted at any time the administrator or authority deems it necessary to do so. For example, a device reset may be done whenever a new policy that includes privilege revocation is instituted. However, this may result in numerous unnecessary device reset events that are potentially inconvenient to the user and may interfere with use of the device. Alternatively, the system may keep track of which devices include which applications, and use this information to determine a less intrusive device reset schedule. For example, resetting only those devices having applications that may potentially be affected by the policy change.

In yet another advantageous embodiment, aspects of previously described embodiments are combined to provide effective privilege management and revocation. According to this exemplary embodiment, the system administrator or other authority has no actual control over when a device is reset. The administrator merely manages the privileges of the system and particular applications. The device itself is responsible for resetting when necessary. In this embodiment, the device keeps track of which applications get access to which privileges. When policies or application control changes, the system detects which privileges have been revoked for which applications. This can be accomplished by simply comparing the old set of privileges with the new set of privileges. For each revoked privilege for a given application, the system determines if the application has ever accessed that privilege in the past. As noted above, the system has been keeping track of these since the system was first started up. If an application has accessed a privilege that is now revoked at any time in the past, the device is reset. For some privileges (e.g., IPC), it still cannot be determined whether a privilege has been used as a result of being passed from another application. To overcome the potential for missing a revocation of privileges when applications pass privileges between themselves, if, for example, IPC (or any other privilege that is able to be passed between applications) is revoked from any application, regardless of if the system has detected that the application has accessed the privilege, the device must be reset. This reset will bring the device back to a known state. Device reset will only be done when necessary, thus limiting the number of resets and solving the problem associated with privileges that have been passed between applications.

Each of these embodiments is useful in a variety of privilege management environments ranging from a low-level low-priority where a modest level of privilege revocation security is needed, resulting in a less robust system, to a highly important ultra-robust environment where user inconvenience is secondary to the need for absolute certainty of privilege revocation.

FIG. 1 is a block diagram showing a computer network and communication system in which electronic devices running applications having access to associated privileges are uses. The computer network 18 includes, for example, various networked computers 28 and, optionally, a message server 26, all linked via a Local Area Network (LAN) 30. The communication system includes a Wide Area Network (WAN) 12 coupled to a computer system 14, a wireless network gateway 16 and the LAN 30 of the computer network 18. The wireless network gateway 16 is also connected to a wireless communication network 20 in which a wireless mobile communication device 22 (hereinafter "mobile device"), is configured to operate. The entire system 10 is typically managed by, among others, a system administrator or like authority 32.

The computer system 14 may be a desktop or laptop personal computer that is configured to communicate with the WAN 12 or any other suitable network, such as, for example, the Internet. Personal computers, such as the computer system 14, typically access the Internet via an Internet Service Provider (ISP), Application Service Provider (ASP), or the like.

The LAN 30 is an example of a typical working computer network environment, in which multiple computers 28 are connected in a network. The computer network 18 is typically located behind a security firewall 24. Within the LAN 30, a message server 26, operating on a computer behind the firewall 24 may act as the primary interface for the owner of the computer network 18 to exchange messages both within the LAN 30 and with other external messaging clients via the WAN 12. Known message servers include, for example, Microsoft Outlook™, Lotus Notes™, Yahoo!™, Messenger, AOL Instant Messenger, or any other client-server or peer-to-peer, or similar messaging clients with various architectures. Messages received by the message server 26 are distributed to mailboxes for user accounts addressed in the received messages, and are then accessed by a user through a messaging client operating on a computer system 28. The foregoing is merely an exemplary description illustrating a client-server architecture, and in no way implies that such architecture is necessary, as other suitable architectures known to those skilled in the art may be used.

Although only a message server 26 is shown in the LAN 30, those skilled in the art will appreciate that a LAN may include other types of servers supporting resources that are shared between the networked computer systems 28, and that the message server 26 may also provide additional functionality, such as dynamic database storage for data such as, but not limited to, calendars, to-do lists, task lists, e-mail and documentation. The message server 26 and electronic messaging are described for illustrative purposes only. Systems and methods for managing and revoking privileges are applicable to a wide range of electronic devices, and are in no way limited to electronic devices with messaging capabilities.

The wireless gateway 16 provides an interface to a wireless network 20, through which messages may be exchanged with a mobile device 22. Such functions as addressing of the mobile device 22, encoding or otherwise transforming messages for wireless transmission, and any other interface functions are performed by the wireless gateway 16. The wireless gateway 16 may be configured to operate with more than one wireless network 20, in which case the wireless gateway 16 also determines a most likely network for locating a given mobile device 22 and possibly track mobile devices as users roam between countries or networks.

The mobile device 22 is, for example, a data communication device, a voice communication device, a dual-mode communication device such as many modern cellular telephones having both data and voice communications functionality, a multiple-mode device capable of voice, data and other types of communications, a personal digital assistant (PDA) enabled for wireless communications, or a laptop or desktop computer system with a wireless modem.

Any computer system with access to the WAN 12 may exchange messages with the mobile device 22 through the wireless network gateway 16. Alternatively, private wireless network gateways such as wireless Virtual Private Network (VPN) routers could be implemented to provide a private interface to a wireless network. A wireless VPN router implemented in the LAN 30 provides a private interface from the LAN 30 to one or more mobile devices such as 22 through the wireless network 20. A private interface to a mobile device 22 may also effectively be extended to entities outside the LAN 30 by providing a message forwarding or redirection system that operates with the message server 26. Such a message redirection system is disclosed in U.S. Pat. No. 6,219,694, which is hereby incorporated into this application by reference. In this type of system, incoming messages received by the message server 26 and addressed to a user of a mobile device 22 are sent through the wireless network interface, either a wireless VPN router, the wireless gateway 16, or another interface, for example, to the wireless network 20 and to the user's mobile device 22. Another alternate interface to a user's mailbox on a message server 26 may be a Wireless Application Protocol (WAR) gateway. Through a WAP gateway, a list of messages in a user's mailbox on the message server 26, and possibly each message or a portion of each message, may be sent to the mobile device 22. A wireless network 20 normally delivers messages to and from communication devices such as the mobile device 22 via RF transmissions between base stations and devices. The wireless network 20 may, for example, be a data-centric wireless network, a voice-centric wireless network, or a dual-mode network that can support both voice and data communications over the same infrastructure. Recently developed networks include Code Division Multiple Access (CDMA) networks and General Packet Radio Service (GPRS) networks. So-called third-generation (3G) networks like Enhanced Data rates for Global Evolution (EDGE) and Universal Mobile Telecommunications Systems (UMTS) are currently under development. Older data-centric networks include, but are not limited to, the Mobitex™ Radio Network ("Mobitex"), and the DataTAC™ Radio Network ("DataTAC"). Voice-centric data networks such as Personal Communication System (PCS) networks, including Global System for Mobile Communications (GSM) and Time Division Multiple Access (TDMA) systems, have been available in North America and world-wide for several years.

Figure 2:
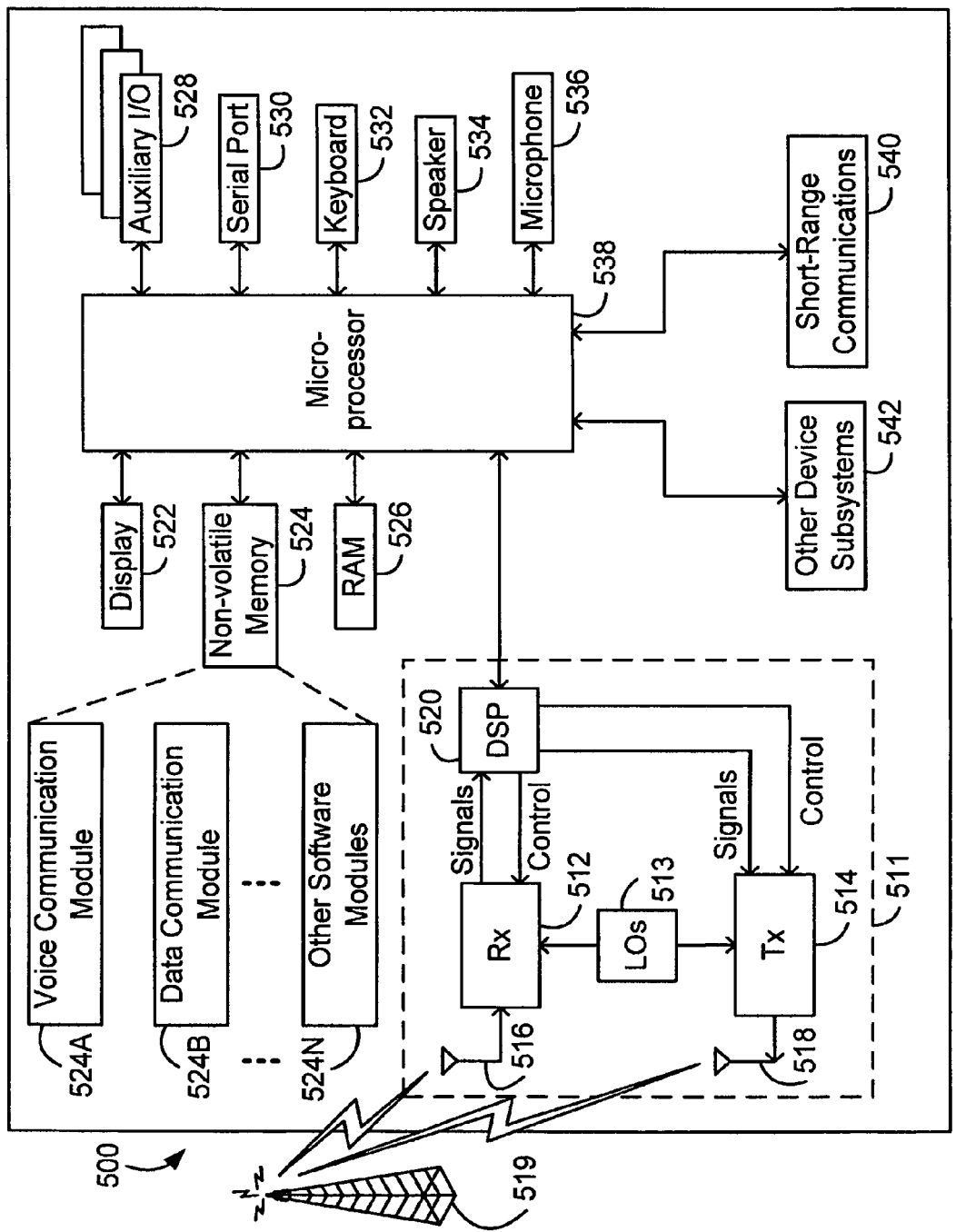
FIG. 2 is a block diagram of a wireless mobile communication device as an example of an electronic device running applications having access to associated privileges.

FIG. 2 is a block diagram of an exemplary wireless mobile communication device as an example of an electronic device. However, it should be understood that the systems and methods disclosed herein may be used with many different types of devices, such as personal digital assistants (PDAs), desktop computers, or the like.

The mobile device 500 is preferably a two-way communication device having at least voice and data communication capabilities. The mobile device 500 preferably has the capability to communicate with other computer systems on the Internet. Depending on the functionality provided by the mobile device, the mobile device may be referred to as a data messaging device, a two-way pager, a cellular telephone with data messaging capabilities, a wireless Internet appliance, or a data communication device (with or without telephony capabilities). As mentioned above, such devices are referred to generally herein as mobile devices.

The mobile device 500 includes a transceiver 511, a microprocessor 538, a display 522, non-volatile memory 524, random access memory (RAM) 526, auxiliary input/output (I/O) devices 528, a serial port 530, a keyboard 532, a speaker 534, a microphone 536, a short-range wireless communications sub-system 540, and may also include other device sub-systems 542. The transceiver 511 preferably includes transmit and receive antennas 516, 518, a receiver (Rx) 512, a transmitter (Tx) 514, one or more local oscillators (LOs) 513, and a digital signal processor (DSP) 520. Within the non-volatile memory 524, the mobile device 500 includes a plurality of software modules 524A-524N that can be executed by the microprocessor 538 (and/or the DSP 520), including a voice communication module 524A, a data communication module 524B, and a plurality of other operational modules 524N for carrying out a plurality of other functions.

The mobile device 500 is preferably a two-way communication device having voice and data communication capabilities. Thus, for example, the mobile device 500 may communicate over a voice network, such as any of the analog or digital cellular networks, and may also communicate over a data network. The voice and data networks are depicted in FIG. 2 by the communication tower 519. These voice and data networks may be separate communication networks using separate infrastructure, such as base stations, network controllers, etc., or they may be integrated into a single wireless network. References to the network 519 should therefore be interpreted as encompassing both a single voice and data network and separate networks.

The communication subsystem 511 is used to communicate with the network 519. The DSP 520 is used to send and receive communication signals to and from the transmitter 514 and receiver 512, and also exchange control information with the transmitter 514 and receiver 512. If the voice and data communications occur at a single frequency, or closely-spaced set of frequencies, then a single LO 513 may be used in conjunction with the transmitter 514 and receiver 512. Alternatively, if different frequencies are utilized for voice communications versus data communications or the mobile device 500 is enabled for communications on more than one network 519, then a plurality of LOs 513 can be used to generate frequencies corresponding to those used in the network 519. Although two antennas 516, 518 are depicted in FIG. 2, the mobile device 500 could be used with a single antenna structure. Information, which includes both voice and data information, is communicated to and from the communication module 511 via a link between the DSP 520 and the microprocessor 538.

The detailed design of the communication subsystem 511, such as frequency band, component selection, power level, etc., is dependent upon the communication network 519 in which the mobile device 500 is intended to operate. For example, a mobile device 500 intended to operate in a North American market may include a communication subsystem 511 designed to operate with the Mobitex or DataTAC mobile data communication networks and also designed to operate with any of a variety of voice communication networks, such as AMPS, TDMA, CDMA, PCS, etc., whereas a mobile device 500 intended for use in Europe may be configured to operate with the GPRS data communication network and the GSM voice communication network. Other types of data and voice networks, both separate and integrated, may also be utilized with the mobile device 500.

Communication network access requirements for the mobile device 500 also vary depending upon the type of network 519. For example, in the Mobitex and DataTAC data networks, mobile devices are registered on the network using a unique identification number associated with each device. In GPRS data networks, however, network access is associated with a subscriber or user of the mobile device 500. A GPRS device typically requires a subscriber identity module ("SIM"), which is required in order to operate the mobile device 500 on a GPRS network. Local or non-network communication functions (if any) may be operable, without the SIM, but the mobile device 500 is unable to carry out functions involving communications over the network 519, other than any legally required operations, such as '911' emergency calling.

After any required network registration or activation procedures have been completed, the mobile device 500 is able to send and receive communication signals, preferably including both voice and data signals, over the network 519. Signals received by the antenna 516 from the communication network 519 are routed to the receiver 512, which provides for signal amplification, frequency down conversion, filtering, channel selection, etc., and may also provide analog to digital conversion. Analog to digital conversion of the received signal allows more complex communication functions, such as digital demodulation and decoding, to be performed using the DSP 520. In a similar manner, signals to be transmitted to the network 519 are processed, including modulation and encoding, for example, by the DSP 520 and are then provided to the transmitter 514 for digital to analog conversion, frequency up conversion, filtering, amplification and transmission to the communication network 519 via the antenna 518. Although a single transceiver 511 is shown for both voice and data communications, in alternative embodiments, the mobile device 500 may include multiple distinct transceivers, such as a first transceiver for transmitting and receiving voice signals, and a second transceiver for transmitting and receiving data signals, or a first transceiver configured to operate within a first frequency band, and a second transceiver configured to operate within a second frequency band.

In addition to processing the communication signals, the DSP 520 also provides for receiver and transmitter control. For example, the gain levels applied to communication signals in the receiver 512 and transmitter 514 may be adaptively controlled through automatic gain control algorithms implemented in the DSP 520. Other transceiver control algorithms could also be implemented in the DSP 520 in order to provide more sophisticated control of the transceiver 511.

The microprocessor 538 preferably manages and controls the overall operation of the mobile device 500. Many types of microprocessors or microcontrollers could be used here, or, alternatively, a single DSP 520 could be used to carry out the functions of the microprocessor 538. Low-level communication functions, including at least data and voice communications, are performed through the DSP 520 in the transceiver 511. High-level communication applications, including the voice communication application 524A, and the data communication application 524B are stored in the non-volatile memory 524 for execution by the microprocessor 538. For example, the voice communication module 524A may provide a high-level user interface operable to transmit and receive voice calls between the mobile device 500 and a plurality of other voice devices via the network 519. Similarly, the data communication module 524B may provide a high-level user interface operable for sending and receiving data, such as e-mail messages, files, organizer information, short text messages, etc., between the mobile device 500 and a plurality of other data devices via the network 519.

The microprocessor 538 also interacts with other device subsystems, such as the display 522, RAM 526, auxiliary I/O devices 528, serial port 530, keyboard 532, speaker 534, microphone 536, a short-range communications subsystem 540 and any other device subsystems generally designated as 542. For example, the modules 524A-N are executed by the microprocessor 538 and may provide a high-level interface between a user of the mobile device and the mobile device. This interface typically includes a graphical component provided through the display 522, and an input/output component provided through the auxiliary I/O devices 528, keyboard 532, speaker 534, or microphone 536. Additionally, the microprocessor 538 is capable of running a variety of applications that may be present in the device non-volatile memory 524, including applications that have access to various privileges, as will be described in more detail herein.

Some of the subsystems shown in FIG. 2 perform communication-related functions, whereas other subsystems may provide "resident" or on-device functions. Notably, some subsystems, such as keyboard 532 and display 522 may be used for both communication-related functions, such as entering a text message for transmission over a data communication network, and device-resident functions such as a calculator or task list or other PDA type functions.

Operating system software used by the microprocessor 538 is preferably stored in a persistent store such as the non-volatile memory 524. In addition to the operating system and communication modules 524A-N, the non-volatile memory 524 may include a file system for storing data. The non-volatile memory 524 may also include data stores for owner information and owner control information. The operating system, specific device applications or modules, or parts thereof, may be temporarily loaded into a volatile store, such as RAM 526 for faster operation. Moreover, received communication signals may also be temporarily stored to RAM 526, before permanently writing them to a file system located in the non-volatile memory 524. The non-volatile memory 524 may be implemented, for example, with Flash memory, non-volatile RAM, or battery backed-up RAM.

An exemplary application module 524N that may be loaded onto the mobile device 500 is a PIM application providing PDA functionality, such as calendar events, appointments, and task items. This module 524N may also interact with the voice communication module 524A for managing phone calls, voice mails, etc., and may also interact with the data communication module 524B for managing e-mail communications and other data transmissions. Alternatively, all of the functionality of the voice communication module 524A and the data communication module 524B may be integrated into the PIM module.

The non-volatile memory 524 preferably provides a file system to facilitate storage of PIM data items on the device. The PIM application preferably includes the ability to send and receive data items, either by itself, or in conjunction with the voice and data communication modules 524A, 524B, via the wireless network 519. The PIM data items are preferably seamlessly integrated, synchronized and updated, via the wireless network 519, with a corresponding set of data items stored or associated with a host computer system, thereby creating a mirrored system for data items associated with a particular user.

The mobile device 500 is manually synchronized with a host system by placing the mobile device 500 in an interface cradle, which couples the serial port 530 of the mobile device 500 to a serial port of the host system. The serial port 530 may also be used to insert owner information and owner control information onto the mobile device 500 and to download other application modules 524N for installation on the mobile device 500. This wired download path may further be used to load an encryption key onto the mobile device 500 for use in secure communications, which is a more secure method than exchanging encryption information via the wireless network 519.

Owner information, owner control information and additional application modules 524N may be loaded onto the mobile device 500 through the network 519, through an auxiliary I/O subsystem 528, through the short-range communications subsystem 540, or through any other suitable subsystem 542, and installed by a user in the non-volatile memory 524 or RAM 526. Such flexibility in application installation increases the functionality of the mobile device 500 and may provide enhanced on-device functions, communication-related functions, or both. For example, secure communication applications may enable electronic commerce functions and other such financial transactions to be performed using the mobile device 500.

When the mobile device 500 is operating in a data communication mode, a received signal, such as a text message or a web page download, will be processed by the transceiver 511 and provided to the microprocessor 538, which preferably further processes the received signal for output to the display 522, or, alternatively, to an auxiliary I/O device 528. Owner information, owner control information, commands or requests related to owner information or owner control information, and software applications received by the transceiver 511 are processed as described above. A user of mobile device 500 may also compose data items, such as email messages, using the keyboard 532, which is preferably a complete alphanumeric keyboard laid out in the QWERTY style, although other styles of complete alphanumeric keyboards such as the known DVORAK style may also be used. User input to the mobile device 500 is further enhanced with the plurality of auxiliary I/O devices 528, which may include a thumbwheel input device, a touchpad, a variety of switches, a rocker input switch, etc. The composed data items input by the user are then transmitted over the communication network 519 via the transceiver 511.

When the mobile device 500 is operating in a voice communication mode, the overall operation of the mobile device 500 is substantially similar to the data mode, except that received signals are output to the speaker 534 and voice signals for transmission are generated by a microphone 536. In addition, the secure messaging techniques described above might not necessarily be applied to voice communications. Alternative voice or audio I/O devices, such as a voice message recording subsystem, may also be implemented on the mobile device 500. Although voice or audio signal output is accomplished through the speaker 534, the display 522 may also be used to provide an indication of the identity of a calling party, the duration of a voice call, or other voice call related information. For example, the microprocessor 538, in conjunction with the voice communication module 524A and the operating system software, may detect the caller identification information of an incoming voice call and display it on the display 522.

A short-range communications subsystem 540 is also included in the mobile device 500. For example, the subsystem 540 may include an infrared device and associated circuits and components, or a Bluetooth or 802.11 short-range wireless communication module to provide for communication with similarly-enabled systems and devices. Thus, owner information insertion, owner control information insertion, and application loading operations as described above may be enabled on the mobile device 500 via the serial port 530 or other short-range communications subsystem 540.

FIG. 2 represents a specific example of an electronic device in which owner control systems and methods described herein may be implemented. Implementation of such systems and methods in other electronic devices having further, fewer, or different components than those shown in FIG. 2 would occur to one skilled in the art to which this application pertains and are therefore considered to be within the scope of the present application.

Figure 3:
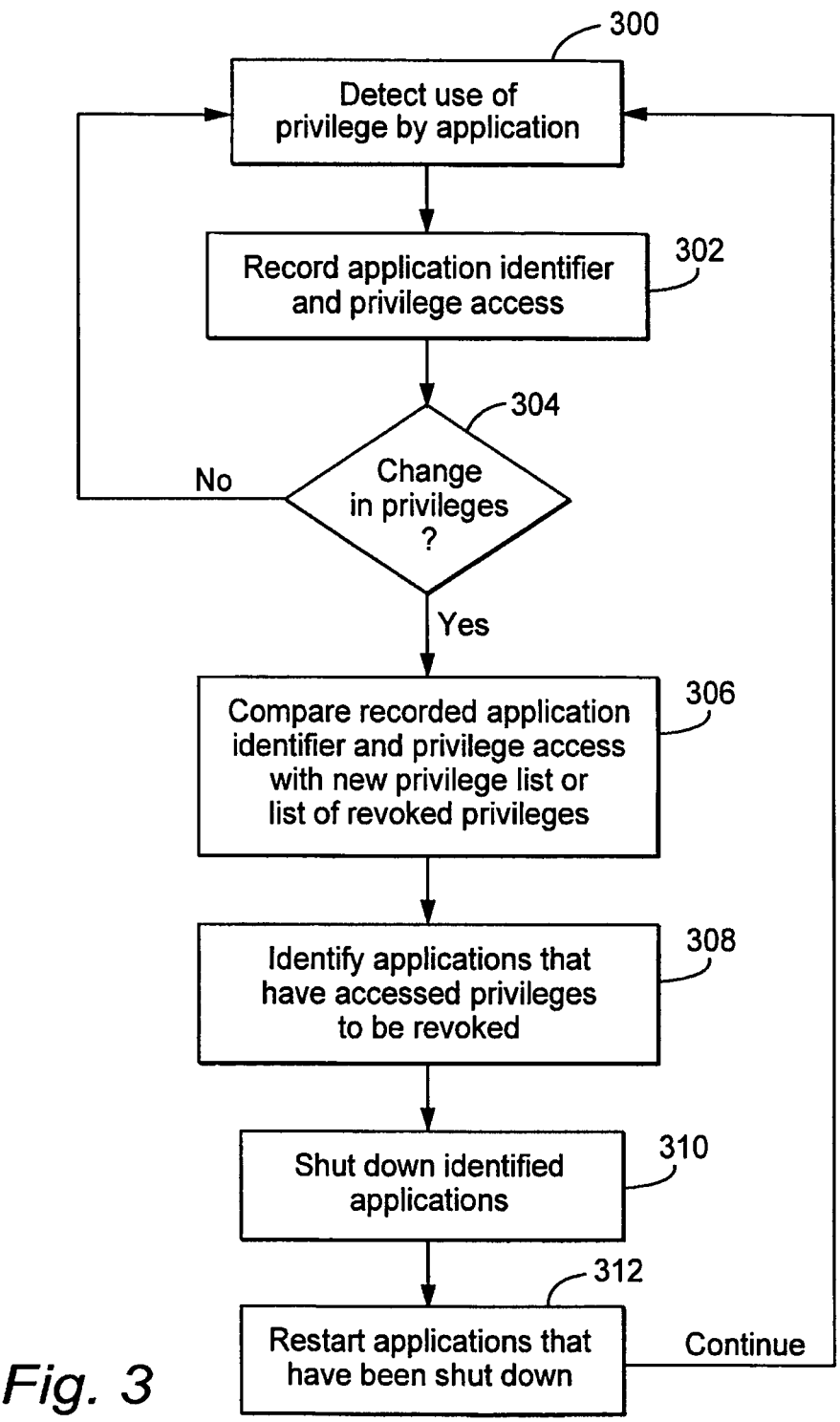
FIG. 3 is a flow diagram illustrating a method of revoking privileges according to an exemplary embodiment.

FIG. 3 is a flow diagram illustrating a method of revoking privileges according to an exemplary embodiment. In this example, an application having privileges that are to be revoked may be shut down. When the application is restarted, access to revoked privileges will be denied. In order to keep track of which applications need to be shut down and reset, the system must keep track of which applications have access to which privileges. To accomplish this, for example, the system monitors and detects use of privileges by applications 300. The system may record an application identifier associated with a particular application and which privilege has been accessed by the application 302. This may be accomplished in any number of conventional methods that are readily apparent to those skilled in the art. For example, a data table listing the application identifier and having pointers directed to privilege(s) accessed by the application or associated with the application identifier. The system then continues to monitor the system for any change, for example, a change in IT policy, that might result in a revocation of privileges 304. So long as no such change is detected in decision block 304, the system continues to monitor and keep track of applications and associated privileges.

Upon a detection of a change that would result in revocation of privileges being accessed by applications in the system by the decision block 304, such as, for example, a change in IT policy, a comparison of the recorded data relating to the accessed privileges with a listing of the new privileges is performed 306. For example, the application identifiers and associated accessed privileges recorded in step 302 are compared to the new privilege list, or to a list of revoked privileges 306. The changes discussed herein are typically instituted and administered by a system administrator or other authority who has responsibility for operation and management of the system.

As a result of the comparison 306, each application that has accessed a privilege(s) to be revoked is identified 308 by the system. Upon identification of these applications, the system implements a shut down of these identified applications 310. When these applications are restarted 312, the applications will not have access to any of the revoked privileges. The system will continue to monitor and detect the accessing of privileges and associated applications as described above.

Figure 4:
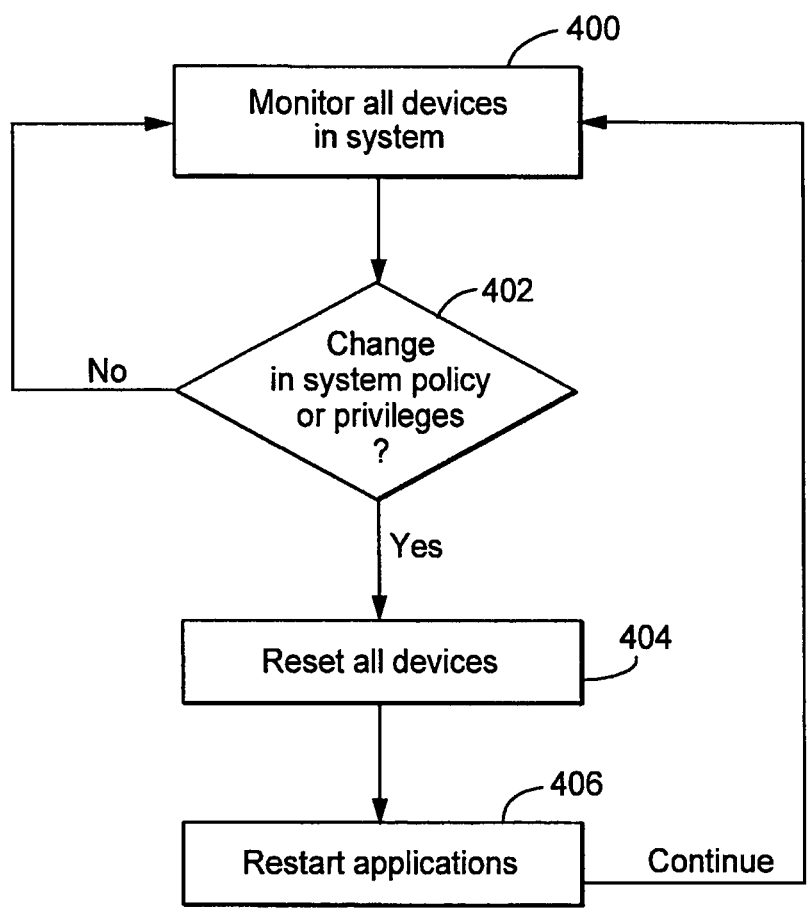
FIG. 4 is a flow diagram illustrating a method of revoking privileges according to another exemplary embodiment.

In another embodiment, as illustrated in the flow diagram of FIG. 4, a device reset may be performed. According to this example, all devices in the system are monitored 400. A system administrator or other authority specifies, for example, that whenever there is a change in system policy that requires revocation or changes in privileges 402, all devices in the system must be reset 404. Resetting the devices brings the system to a known state, i.e., a state in which the system knows which applications have access to which privileges throughout the system. Upon restarting these applications 406 after the device reset 404, the applications will no longer have access to any of the revoked privileges. According to this example, a device reset may be instituted any time the system administrator or authority deems it necessary to do so. For example, a device reset may be done whenever a new policy that includes privilege revocation is instituted. As a result, this solution may invoke numerous (potentially unnecessary) device reset events that may be intrusive and inconvenient for the users. However, this embodiment provides very robust and timely privilege revocation, and is thus suitable to highly secure systems where privilege management is more important than user convenience.

Figure 5:
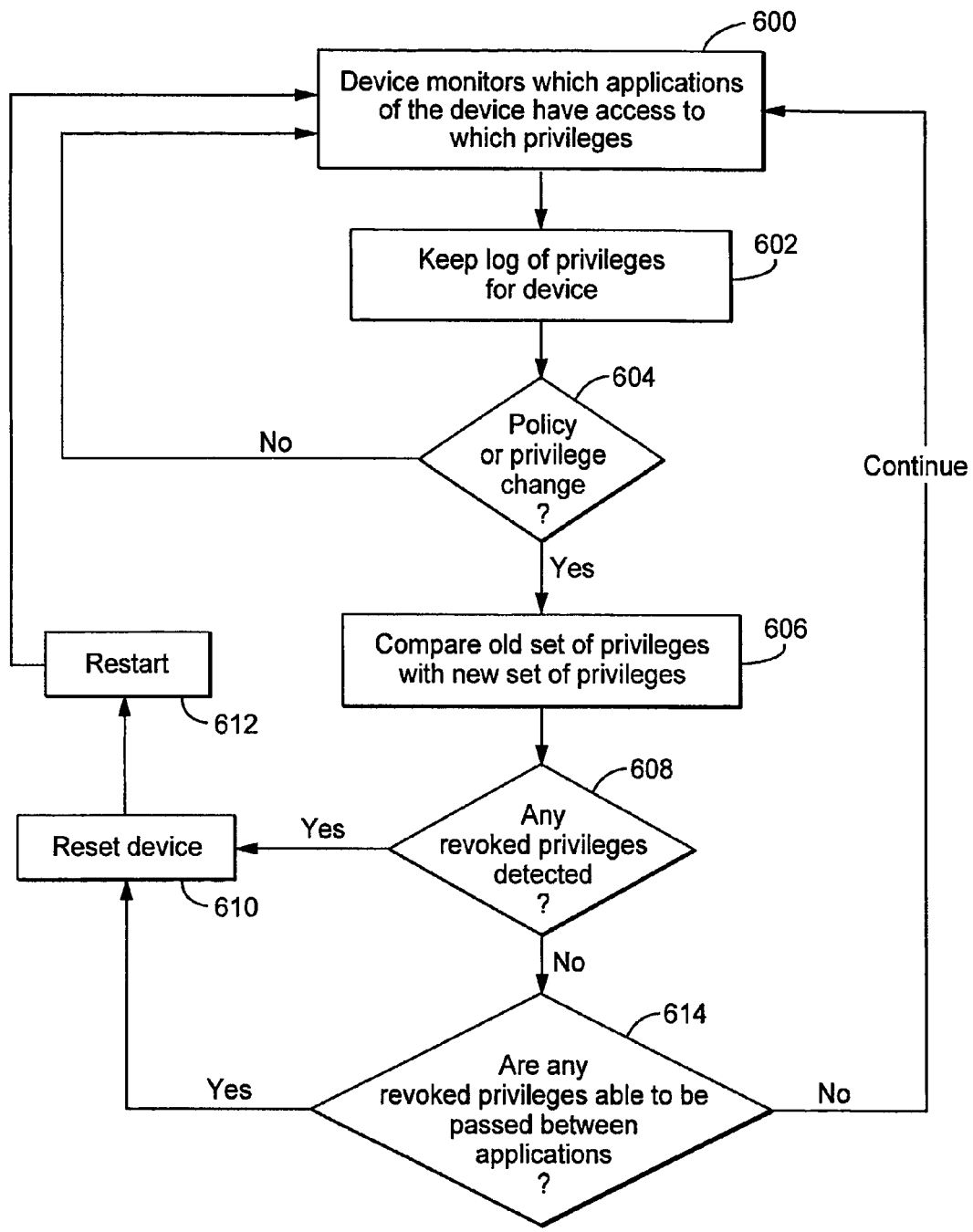
FIG. 5 is a flow diagram illustrating yet another method of revoking privileges according to another exemplary embodiment.

Turning now to FIG. 5, another advantageous embodiment implementing features of both embodiments described above with respect to FIGS. 3 and 4 is illustrated. According to this example, aspects of the previously described embodiments are combined to provide highly effective and timely privilege management and revocation. In this example, the system administrator or authority has no actual control over when a device is reset. The administrator or authority merely manages the privileges of the system and of particular applications. The device itself is responsible for resetting as needed.

In this example, the device monitors which applications of the device have access to which privileges 600, and a log of privileges for the device is kept 602. The device monitors whether policies or application control changes are made in the system 604. If there is no change detected 604, the device continues to monitor applications and keep a log of privileges for the device 600, 602. If a change in policy or application control is detected in step 604, the system determines which privileges have been revoked for which applications by comparing the old set of privileges in the log with the new set of privileges received from the system administrator 606. The device then determines if any revoked privileges are present on the device 608. If revoked privileges are detected, e.g., if an application has accessed a privilege at any time in the past that has now been revoked, the device will reset 610. As described above, resetting the device brings the system to a known state in which all applications and privileges are known. After the device is reset 610, it is restarted 612. Upon restart 612, the device applications will have access to the correct privileges. Advantageously, if no revoked privileges are detected in step 608, the device performs another check to ensure that no privileges that have been passed between application have been missed. As explained above, for some privileges, e.g., IPC, it cannot be determined whether a privilege has been used as a result of being passed from another application. To overcome the potential for missing revocation of privileges when applications pass privileges between themselves, the system checks for privileges that are able to be passed between applications (e.g., IPC) 614. If a privilege that is able to be passed between applications is revoked from any application, regardless of if the system has detected that the application has accessed the privilege 614, the device must be reset 610 to bring the system to a known state. After resetting, the device is restarted 612, and will now have the only have access to the correct privileges. In this manner, device reset will only be performed when necessary, thus limiting the number of resets and solving the problem associated with privileges that go undetected due to their ability to be passed between applications.

While this disclosure describes specific exemplary embodiments, it is evident that many alternatives, modifications and variations will be apparent to those skilled in the art. Accordingly, the exemplary embodiments described herein, are intended to be illustrative, not limiting. Various changes may be made without departing from the true spirit and full scope of the invention, as defined in the following claims.

The invention claimed is:

1. A computer-implemented method for managing privileges associated with applications, the method comprising:
monitoring a plurality of electronic devices within a system;
detecting a change in privileges associated with one or more applications resident on the plurality of electronic devices, wherein one or more privileges that are to be revoked are identified; and
in response to a detection of the change in privileges, revoking the one or more privileges, such that each of the one or more applications resident on the plurality of electronic devices no longer has access to the one or more privileges,
wherein the one or more privileges comprises enabling the injection of browser filters.

2. A system for managing privileges associated with applications, the system comprising at least one processor configured to:
monitor a plurality of electronic devices within a system;
detect a change in privileges associated with one or more applications resident on the plurality of electronic devices, wherein one or more privileges that are to be revoked are identified; and
in response to a detection of the change in privileges, revoke the one or more privileges, such that each of the one or more applications resident on the plurality of electronic devices no longer has access to the one or more privileges,
wherein the one or more privileges comprises enabling the injection of browser filters.

3. The computer-implemented method as recited in claim 1, further comprising restarting each of the one or more applications.

4. The computer-implemented method as recited in claim 1, further comprising resetting the plurality of electronic devices.

5. The computer-implemented method as recited in claim 4, wherein resetting the plurality of electronic devices brings the system to a known state.

6. The computer-implemented method as recited in claim 4, further comprising restarting the one or more applications resident on the plurality of electronic devices after the plurality of electronic devices has been reset.

7. The computer-implemented method as recited in claim 1, wherein the change in privileges is responsive to a change in system information technology (IT) policy.

8. The computer-implemented method as recited in claim 1, the method further comprising:
maintaining, at each of the plurality of electronic devices, a log of privileges accessed by applications resident on that electronic device; and
in response to receiving a new set of privileges at that electronic device, comparing the log of privileges with the new set of privileges to identify the one or more privileges that are to be revoked.

9. The system as recited in claim 2, wherein the at least one processor is configured to restart each of the one or more applications.

10. The system as recited in claim 2, wherein the at least one processor is configured to reset the plurality of electronic devices.

11. The system as recited in claim 10, wherein the at least one processor is configured to bring each of the plurality of electronic devices to a known state.

12. The system as recited in claim 10, wherein the at least one processor is configured to restart the one or more applications resident on the plurality of electronic devices after the plurality of electronic devices has been reset.

13. The system as recited in claim 2, wherein the change in privileges is responsive to a change in system information technology (IT) policy.

14. The system as recited in claim 2, wherein the at least one processor is configured to:
maintain, at each of the plurality of electronic devices, a log of privileges accessed by applications resident on that electronic device; and
in response to receiving a new set of privileges at that electronic device, compare the log of privileges with the new set of privileges to identify the one or more privileges that are to be revoked.

15. A non-transitory computer-readable medium storing instructions which, when executed by a processor of a computer system, result in:
monitoring a plurality of electronic devices within a system;
detecting a change in privileges associated with one or more applications resident on the plurality of electronic devices, wherein one or more privileges that are to be revoked are identified; and in response to a detection of the change in privileges, revoking the one or more privileges, such that each of the one or more applications resident on the plurality of electronic devices no longer has access to the one or more privileges, wherein the one or more privileges comprises enabling the injection of browser filters.

16. The non-transitory computer-readable medium as recited in claim 15, wherein the instructions, when executed by the processor, further result in restarting each of the one or more applications.

17. The non-transitory computer-readable medium as recited in claim 15, wherein the instructions, when executed by the processor, further result in resetting the plurality of electronic devices.

18. The non-transitory computer-readable medium as recited in claim 17, wherein resetting the plurality of electronic devices brings the system to a known state.

19. The non-transitory computer-readable medium as recited in claim 17, wherein the instructions, when executed by the processor, further result in restarting the one or more applications resident on the plurality of electronic devices after the plurality of electronic devices has been reset.

20. The non-transitory computer-readable medium as recited in claim 15, wherein the instructions, when executed by the processor, further result in:

maintaining, at each of the plurality of electronic devices, a log of privileges accessed by applications resident on that electronic device; and in response to receiving a new set of privileges at that electronic device, comparing the log of privileges with the new set of privileges to identify the one or more privileges that are to be revoked.

* * * * *